(12) United States Patent
Templer et al.

(10) Patent No.: US 8,725,290 B2
(45) Date of Patent: *May 13, 2014

(54) ELECTRONICALLY CONTROLLED AND MONITORED ENCLOSURE TO DISPENSE PRODUCT PACKAGES

(71) Applicant: Exchange Services, Inc., Palmer, TX (US)

(72) Inventors: John Wesley Templer, Palmer, TX (US); Mark Allsup, Fort Worth, TX (US)

(73) Assignee: Exchange Services, Inc., Palmer, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,388

(22) Filed: Mar. 12, 2013

(65) Prior Publication Data

US 2013/0297067 A1    Nov. 7, 2013

Related U.S. Application Data

(63) Continuation of application No. 12/335,873, filed on Dec. 16, 2008, now Pat. No. 8,401,697.

(60) Provisional application No. 61/030,442, filed on Feb. 21, 2008.

(51) Int. Cl.
*G06F 17/00* (2006.01)

(52) U.S. Cl.
USPC .......................................... 700/236; 221/279

(58) Field of Classification Search
USPC .............................. 221/56, 210; 700/236, 244
See application file for complete search history.

(56) References Cited

U.S. PATENT DOCUMENTS

| | | | |
|---|---|---|---|
| 3,870,135 A | 3/1975 | Allen | |
| 5,207,784 A | 5/1993 | Schwartzendruber | |
| 5,243,174 A | 9/1993 | Veeneman et al. | |
| 5,805,456 A * | 9/1998 | Higham et al. | 700/236 |
| 5,847,389 A | 12/1998 | Mertins et al. | |
| 5,959,869 A | 9/1999 | Miller et al. | |
| 5,971,205 A | 10/1999 | Michaels et al. | |
| 6,206,234 B1 | 3/2001 | Rawlins | |
| 6,213,341 B1 * | 4/2001 | Keith et al. | 700/236 |
| 6,259,965 B1 * | 7/2001 | Steele et al. | 700/236 |
| 6,269,285 B1 | 7/2001 | Mignault | |
| 6,324,520 B1 | 11/2001 | Walker et al. | |
| 6,384,402 B1 | 5/2002 | Hair et al. | |
| 6,393,339 B1 | 5/2002 | Yeadon | |
| 6,424,884 B1 | 7/2002 | Brooke et al. | |
| 6,539,282 B2 | 3/2003 | Metcalf et al. | |
| 6,604,652 B1 | 8/2003 | Trautwein | |
| 6,684,126 B2 | 1/2004 | Omura et al. | |
| 6,708,079 B2 | 3/2004 | Mason | |

(Continued)

*Primary Examiner* — Timothy Waggoner
(74) *Attorney, Agent, or Firm* — Fish & Richardson P.C.

(57) ABSTRACT

A device for storing and dispensing tobacco products includes a housing configured to store tobacco product packages, a tracking system, and an electronic system. The housing may contain a plurality of chambers, each configured to store a different brand of tobacco product packages. The tracking system is configured to track the number of tobacco product packages in each chamber as tobacco product packages are dispensed from the chambers and to include one or more light emitting elements and one or more light detection elements. The electronic system is configured to enable dispensing of the tobacco product packages from the chambers and to store information related to the dispensing of the packages from the chambers.

20 Claims, 6 Drawing Sheets

(56) References Cited

U.S. PATENT DOCUMENTS

| | | |
|---|---|---|
| 6,711,465 B2 | 3/2004 | Tomassi |
| 6,792,334 B2 | 9/2004 | Metcalf et al. |
| 6,808,082 B2 * | 10/2004 | Ohkubo .................. 221/123 |
| 6,896,145 B2 | 5/2005 | Higgins et al. |
| 7,086,560 B2 * | 8/2006 | Shioya .................... 221/191 |
| 7,530,113 B2 | 5/2009 | Braun |
| 8,019,471 B2 | 9/2011 | Bogash et al. |
| 8,401,697 B2 * | 3/2013 | Templer et al. .......... 700/236 |
| 2002/0046122 A1 | 4/2002 | Barber et al. |
| 2004/0252676 A1 | 12/2004 | Bye |
| 2004/0254676 A1 | 12/2004 | Blust et al. |
| 2005/0269347 A1 | 12/2005 | Templer et al. |
| 2006/0235569 A1 | 10/2006 | Watts |
| 2007/0185615 A1 | 8/2007 | Bossi et al. |
| 2009/0192837 A1 | 7/2009 | Templer et al. |

* cited by examiner

| Time | Chamber | # of Packages | Operator | SKU |
|---|---|---|---|---|
| 11/1/2007 12:34 PM | A | 12 | TAR | 1111 |
| 11/1/2007 12:38 PM | B | 11 | TAR | 2222 |
| 11/1/2007 12:40 PM | D | 11 | TAR | 4444 |
| 11/1/2007 12:42 PM | C | 12 | TAR | 3333 |
| 11/1/2007 12:45 PM | D | 10 | TAR | 4444 |
| 11/1/2007 12:48 PM | B | 10 | TAR | 2222 |
| 11/1/2007 12:52 PM | B | 8 | HZA | 2222 |

ELECTRONICALLY CONTROLLED AND MONITORED ENCLOSURE TO DISPENSE PRODUCT PACKAGES

CROSS-REFERENCE TO RELATED APPLICATION

This application is a continuation of, and claims priority under 35 U.S.C. §120 to, U.S. patent application Ser. No. 12/335,873 filed Dec. 16, 2008, and entitled "Electronically Controlled and Monitored Enclosure to Dispense Tobacco Products," which claims priority to U.S. Provisional Patent Application Ser. No. 61/030,442 filed Feb. 21, 2008, and entitled "Electronically Controlled and Monitored Enclosure to Dispense Tobacco Products," the contents of both applications are incorporated herein by reference.

TECHNICAL FIELD

This application relates to an electronic device for use by tobacco retailers in controlling and monitoring the dispensing of cigarettes and other tobacco products.

BACKGROUND

Tobacco retailers, such as convenience stores, drug stores, and supermarkets, face many challenges with the sale of tobacco products. These challenges include thefts by employees and customers, restrictions of sales to minors, and improper sales of individual, unpackaged cigarettes. In addition, most tobacco retailers have no choice but to manually track tobacco sales and inventory. This manual tracking is prone to error and manipulation by employees. Manual tracking of inventory also puts demands on the time and resources of tobacco retailers when determining their restocking and reordering needs.

SUMMARY

In one aspect, a device for storing and dispensing tobacco products includes a housing configured to store tobacco product packages in a plurality of chambers, a tracking system, and an electronic system. The tracking system is configured to track the number of tobacco product packages in each chamber as tobacco product packages are dispensed from the chambers and to include one or more light emitting elements and one or more light detection elements. The electronic system is configured to enable dispensing of the tobacco product packages from the chambers and to store information related to the dispensing of the packages from the chambers.

Implementations of this aspect may include one or more of the following features. For example, the housing may contain multiple chambers, each configured to store a different brand of tobacco product packages. The housing may include a slot for dispensing the packages and/or a lockable door configured to be opened to stock the product packages in the housing. The housing may include a pusher-foot and the one or more light emitting elements of the tracking system may be connected to the pusher-foot.

The tracking system may include one or more light-emitting diodes (LEDs). The number of light detection elements in each chamber may be equal to the maximum number of tobacco product packages that may be stored in each chamber.

The electronic system may include an input device that enables an operator to dispense the packages from the chambers of the housing, a storage device that stores the information related to the dispensing of the packages from the housing, and/or an output device that enables an operator to obtain the information related to the dispensing of the packages from the chambers of the housing. The information may relate to inventory of the packages and/or to operator use of the device. For example, the information may include a tobacco product package brand identifier, an operator identifier, time information, a chamber identifier, and/or the number of tobacco product packages in each of the plurality of chambers. The housing may include a portion that enables at least some of the packages to be viewed from outside the housing and/or a portion configured to display advertising information related to the packages.

In another aspect, storing and dispensing tobacco products includes storing tobacco product packages in a plurality of chambers of a housing, receiving, from an operator, an indication to dispense one or more of the tobacco product packages, dispensing the one or more of the tobacco product packages in response to the received indication, detecting light, from one or more light emitting elements, at one or more light detection elements in each of the plurality of chambers, determining the number of tobacco product packages in each of the plurality of chambers in response to the detection of light, and storing information related to the dispensing of the one or more of the tobacco product packages, wherein the information comprises the number of tobacco product packages in each of the plurality of chambers.

Implementations of this aspect may include one or more of the following features. For example, the one or more light emitting elements may include one or more light-emitting diodes (LEDs). The number of light detection elements in each chamber may equal the maximum number of tobacco product packages that may be stored in each chamber.

The information related to the dispensing of the tobacco product packages may include a chamber identifier, the number of tobacco product packages in each of the plurality of chambers, a tobacco product package brand identifier, an operator identifier, and/or time information. The information may be outputted, for example, to an operator. The indication to dispense one or more of the of tobacco product packages may be an operator code associated with the device and the operator.

Storing the packages in the housing may include storing different brands of the packages in different chambers in the housing. Electronically dispensing one or more of the packages may include actuating an input device. Electronically tracking information may include electronically storing the information in a storage device and/or receiving output of the information. The information may relate to inventory of the packages and/or to operator use of the device. At least some of the packages may be viewed from outside the housing and/or advertising information related to the packages may be displayed on the housing.

The details of one or more implementations are set forth in the accompanying drawings and the description below. Other features will be apparent from the description, the drawings, and the claims.

DETAILED DESCRIPTION

Figure 1:
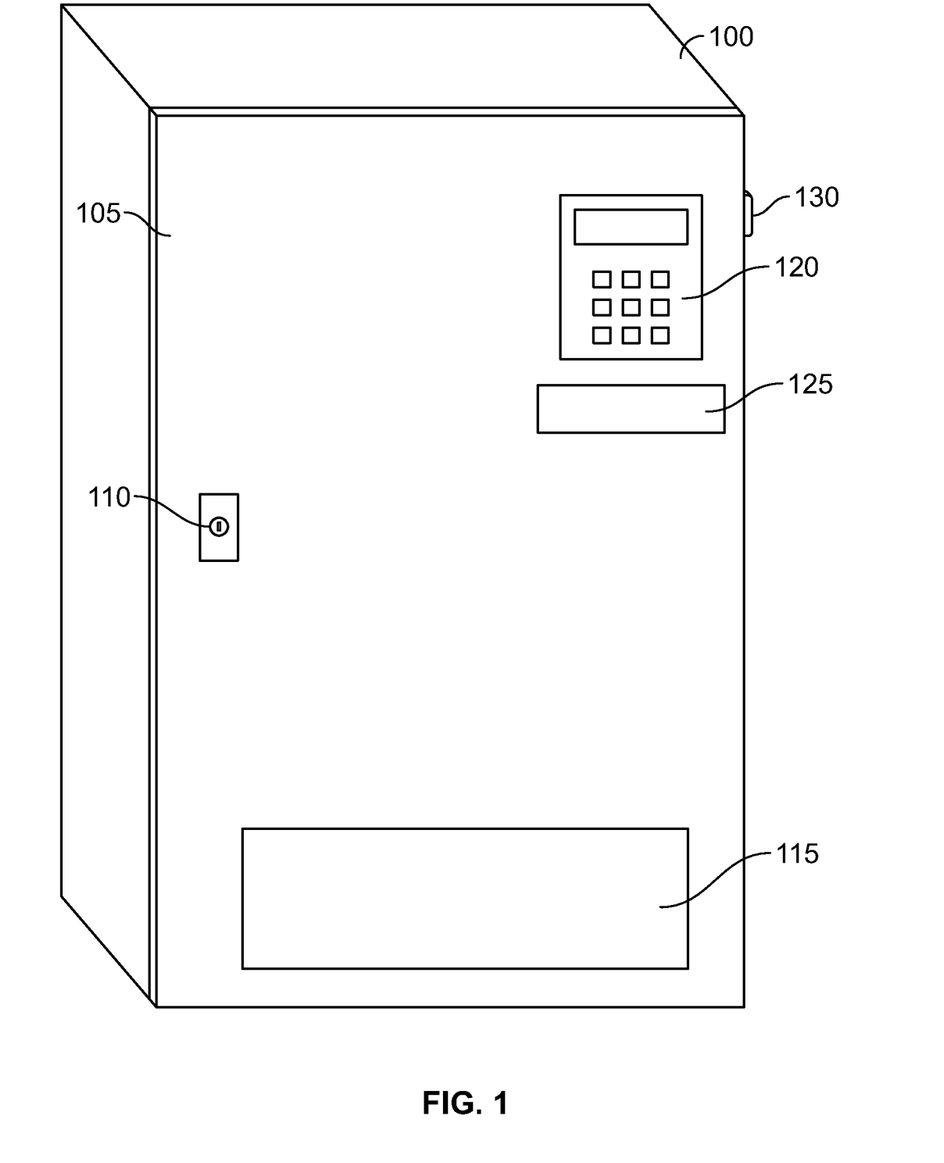
FIG. 1 is a diagram of a cabinet for dispensing tobacco products.
Figure 2:
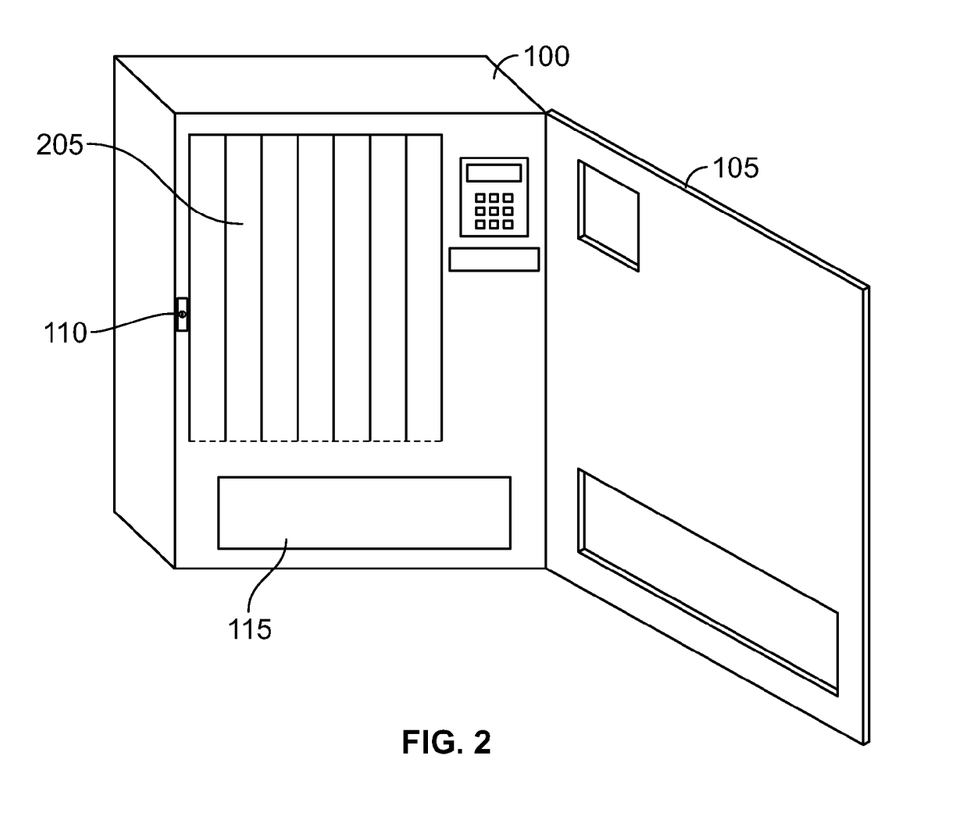
FIG. 2 is a diagram of the cabinet of FIG. 1 with the door open.

With reference to FIGS. 1 and 2, an electronically controlled and monitored dispensing cabinet 100 includes numerous individual chambers 205 designed to store cigarette packages. The cabinet 100 includes a door 105 that may be secured using a locking mechanism 110 such that the chambers 205 are accessible only to designated personnel, such as store managers or owners. These designated personnel can stock the cabinet by adding cigarette packages to the individual chambers. Each of the chambers is electronically assigned to the particular brand of cigarette it contains through use of an operator keypad 120 or a computer port 130. Such assignments are configurable by the designated personnel, and reference the specific SKU for the particular brand of cigarette.

Once the cabinet is stocked and locked, an operator, such as a store clerk, can dispense individual cigarette packages or cartons. All the operator must do is select which brand of cigarette the customer requests, and provide his or her personal operator code using the keypad 120. Once selected, the desired cigarette package is released from the corresponding chamber, which allows the operator to take a pack from the dispensing slot 115 and complete the transaction with the customer. Each cigarette package released from the cabinet is electronically recorded, thereby providing a record to accompany the corresponding transaction. This allows the inventory to be physically locked, yet available for operators to sell individual packages or cartons to customers.

The cabinet includes an electronic system capable of tracking and storing information relating to the inventory of the chambers and the disbursement of the cigarette packages. This information can be accessed through the computer port 130 or by using an integrated printer 125 or through a wireless connection between the cabinet and a computer.

This electronic capability facilitates inventory control in a variety of ways. First, each time an operator dispenses a cigarette pack or carton, the system records information pertaining to that individual transaction. This information includes, but is not limited to, the time the transaction occurred, the individual product SKU of the cigarette (thus recording the brand of cigarette sold), and the operator who dispensed the cigarette package. The information for each transaction is stored in the system, which allows the designated personnel to review individual transactions. Second, in addition to the individual sales records, the system provides real-time inventory and aggregate sales totals. These aggregate records provide the tobacco retailer with accurate and easily accessible data in order to assess restocking and reordering or tobacco products.

Once the cabinet is stocked and locked, an operator, such as a store clerk, can dispense individual cigarette packages or cartons. All the operator must do is select which brand of cigarette the customer requests, and provide his or her personal operator code using the keypad 120. Once selected, the desired cigarette package is released from the corresponding chamber, which allows the operator to take a pack from the dispensing slot 115 and complete the transaction with the customer. Each cigarette package released from the cabinet is electronically recorded, thereby providing a record to accompany the corresponding transaction. This allows the inventory to be physically locked, yet available for operators to sell individual packages or cartons to customers.

Figure 3:
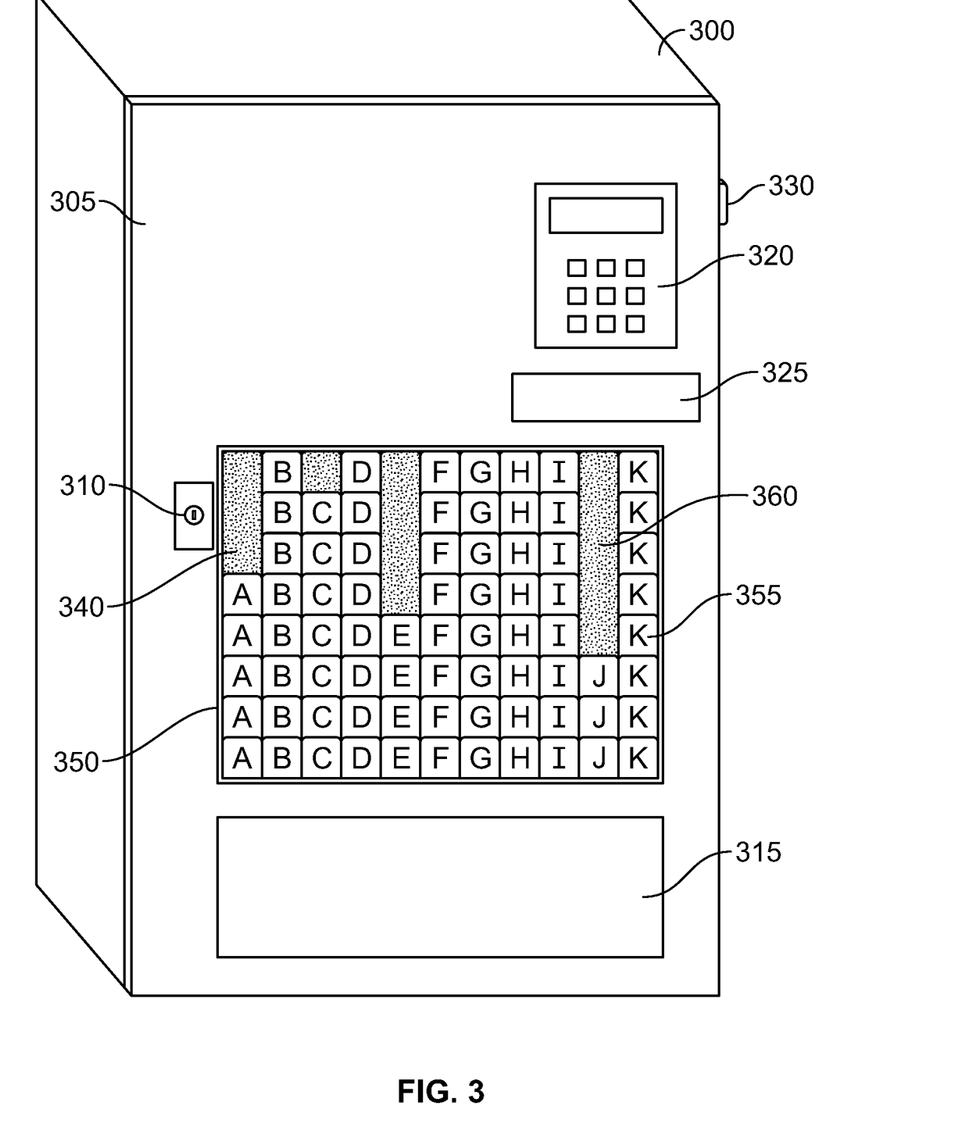
FIG. 3 is a diagram of another implementation of a cabinet for dispensing tobacco products.

Referring to FIG. 3, in another implementation, an electronically controlled and monitored dispensing cabinet 300 for dispensing cigarette packages 355. Cabinet 300 has a door 305, a lock 310, a slot 315, a keypad 320, a printer 325, and a computer port 330 that function analogous to door 105, lock 110, slot 115, keypad 120, printer 125, and computer port 130, respectively, described above. Door 305 has a transparent or translucent window 350 made from glass, plexiglass, plastic, or another similar material. Window 350 allows numerous individual chambers 340 behind door 305 to be visible from outside of cabinet 300. Window 350 assists with marketing of cigarettes by allowing a customer to view the cigarette packages 355 stored in chambers 340. For example, as shown in FIG. 3, chambers 340 contain cigarette packages 355 of Brands A through K. In addition, window 350 allows the owner or operator to view the amount of each brand of cigarette that is remaining in the cabinet. When a space 360 appears above packages 355, the owner or operator knows that it is time to restock that particular brand of cigarette. Thus, window 350 provides a visual inventory to supplement the electronic inventory that can be accessed through keypad 320, printer 325, and/or computer port 330.

Figure 4:
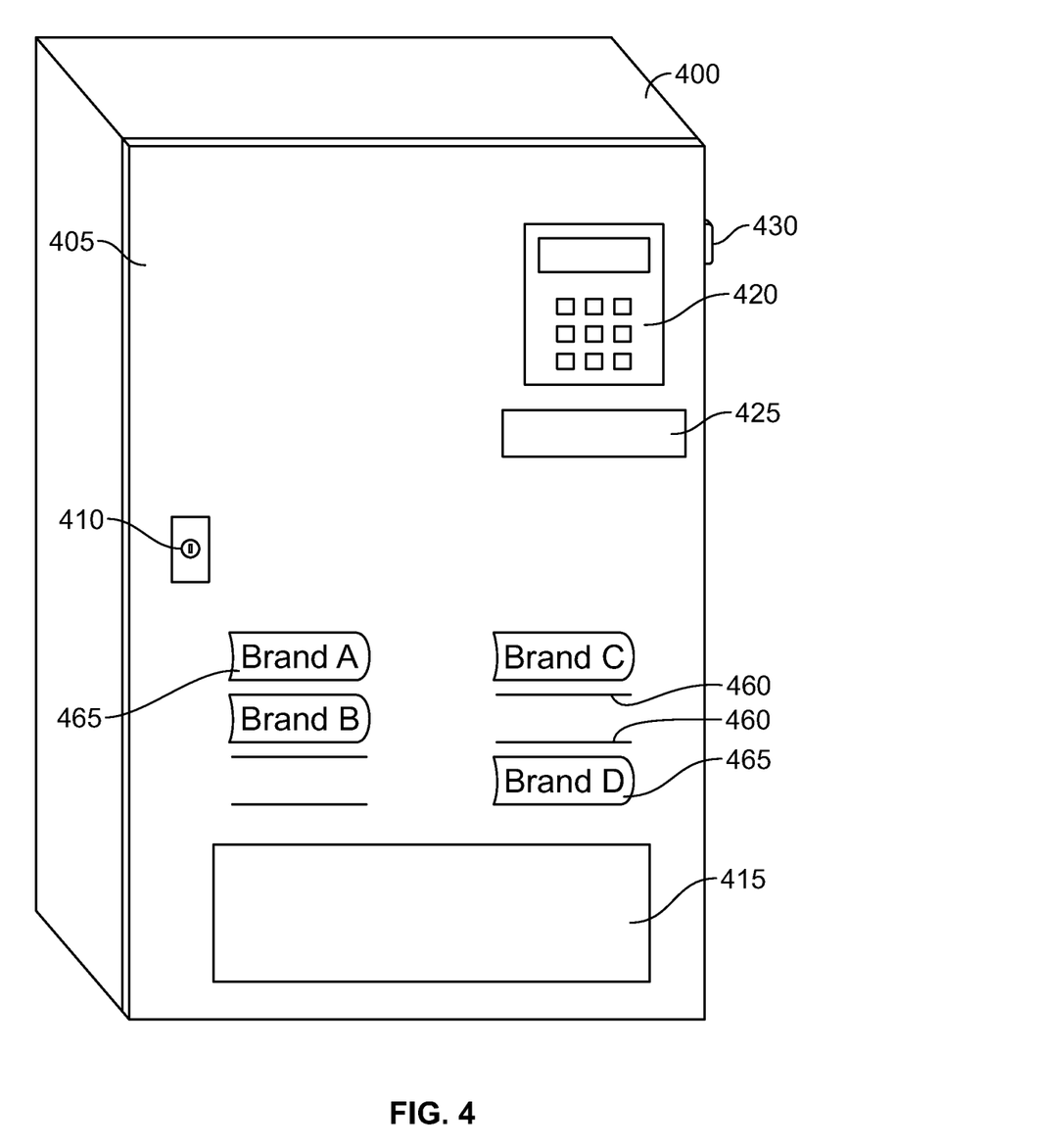
FIG. 4 is a diagram of yet another implementation of a cabinet for dispensing tobacco products.

Referring to FIG. 4, in another implementation, an electronically controlled and monitored dispensing cabinet 400 for dispensing cigarette packages includes a door 405, a lock 410, a slot 415, a keypad 420, a printer 425, and a computer port 430 that function in the same way as door 105, lock 110, slot 115, keypad 120, printer 125, and computer port 130, respectively, described above. Door 405 has one or more grooves 460 that receive placards 465 for advertising the brands of cigarettes being housed in cabinet 400. Grooves 460 and placards 465 help the owner or operator market the cigarette packages being sold via dispensing cabinet 400.

Figure 5:
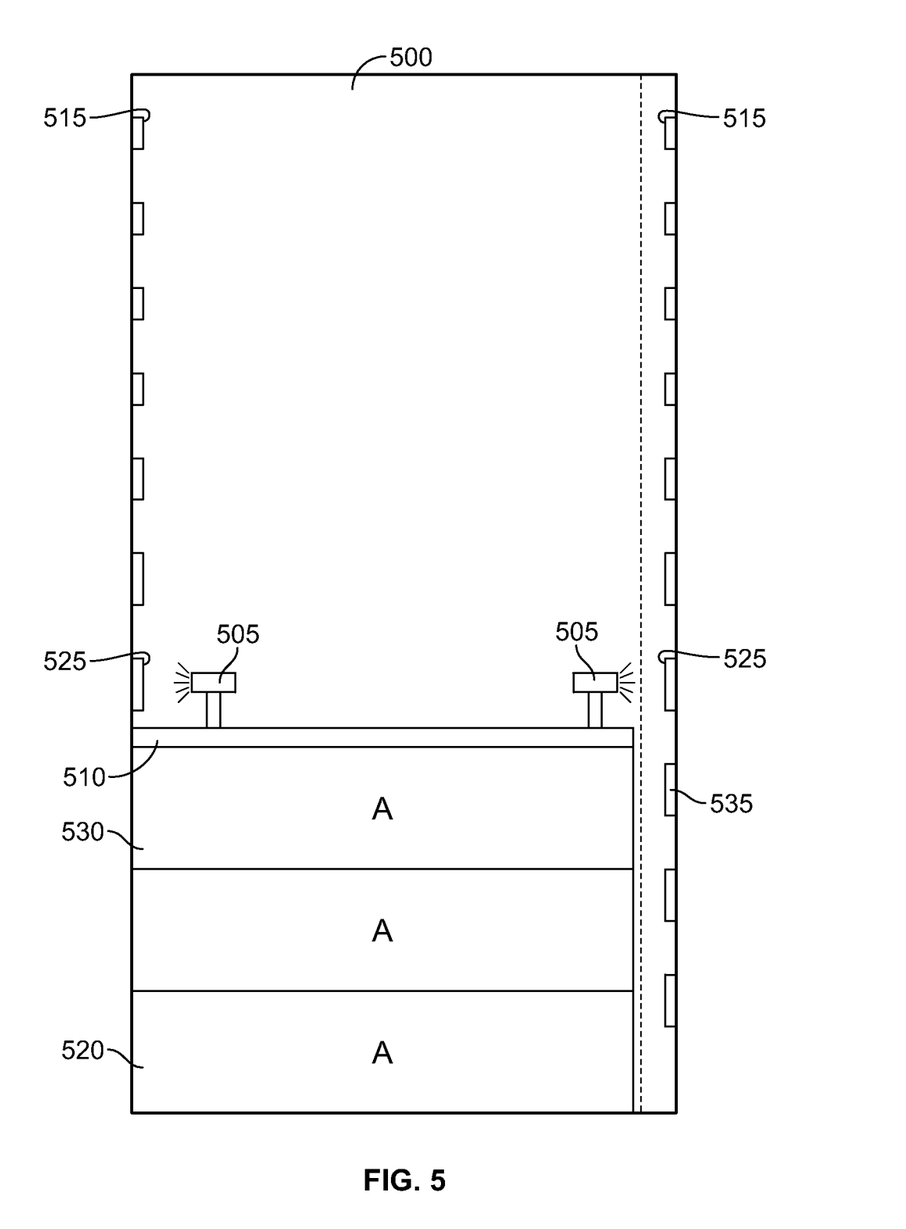
FIG. 5 is a diagram of a side view of a chamber tracking tobacco products.

Referring to FIG. 5, in another implementation, a tracking system for determining the number of cigarette packages 520 is included in chamber 500 of an electronically controlled and monitored dispensing cabinet for dispensing cigarette packages 520. The system has light emitting element 505, such as a light emitting diode (LED), connected to a spring-loaded pusher-foot 510 and multiple light detecting elements 515, such as photocells, photoresistors, photodiode, and phototransistors, positioned in a row along the chamber 500. For example, the chamber 500 may include three cigarette packages 520 and the pusher-foot 510 would be located directly above the top cigarette package 530. The light emitting element 505 is arranged so as to emit light onto the light detecting element 525 when there are three packages. Light detected at light detecting element 525 is indicative that there are three cigarette packs in the chamber 500. If one cigarette package 520 is dispensed, the pusher-foot 510 will move downward such that the light emitting element 505 would emit light onto light detecting element 535. Light detected at light detecting element 535 is indicative that there are two cigarette packs in the chamber 500.

In this implementation, the number of light detecting elements 515 in chamber 500 is equal to the maximum number of cigarette packages 520 that the chamber 500 may store. For example, if the chamber 500 may store a maximum of twelve cigarette packages, twelve light detecting elements 515 will be positioned in a row along the chamber 500. As a result, each light detecting element 515 corresponds to a number of cigarette packages in the chamber 500. In another implementation, there may be more than one light detecting element 515 for every cigarette package 520 that may be stored in the chamber 500, or one light detecting element 515 for every two cigarette packages.

In still another implementation, the tracking system may include more than one row of light detecting elements 515 and more than one light emitting element 505. For example, the tracking system may include two rows of light detecting elements 515 located at opposite sides of chamber 500 and two light emitting elements 505 located at opposite sides of the pusher-foot 510. Such an implementation may provide greater reliability in the case that one of the light detecting elements 515 or one of the light emitting elements 505 fails.

In another implementation, the tracking system may determine the number of cigarette packages in the chamber 500 according to a determination of the position of the pusher-foot 510 by an imaging device. An imaging device, such as a digital camera, may be connected to the pusher-foot 510 and continuously image the chamber 500. Sequential images from the imaging device may then be compared to determine the magnitude of movement of the pusher-foot 510. The magnitude of movement of the pusher-foot 510 may be used to determine the change in the number of cigarette packages in the chamber 500.

The cabinet includes an electronic system capable of tracking and storing information relating to the inventory of the chambers and the disbursement of the cigarette packages. In addition to storing the time at which a transaction occurred, the individual product SKU of the cigarette package, and the operator who supplied or dispensed the cigarette package, the electronic system may store a chamber identifier and the number of cigarette packs in the chamber. For example, the tracking system may determine that there are three cigarette packs 520 in chamber 500. In response to this determination, the electronic system will store the chamber identifier, the number of packs in the chamber, and the time the determination was made. This information can be accessed through the computer port or by using an integrated printer or through a wireless connection between the cabinet and a computer.

Figure 6:
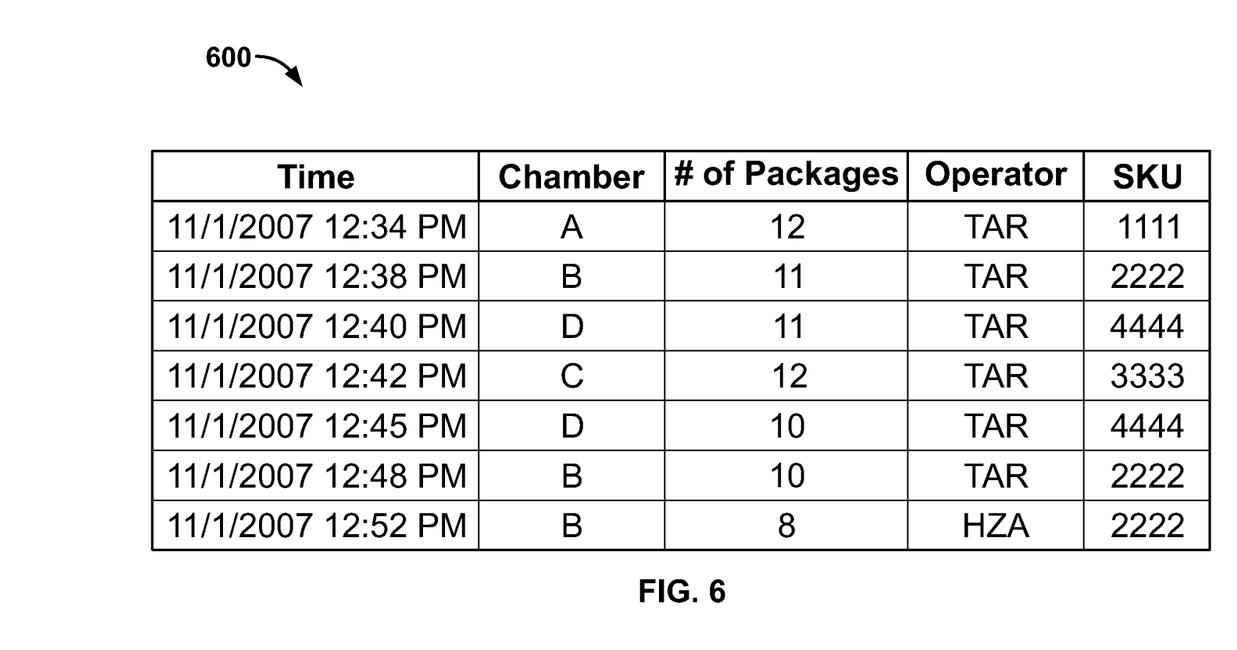
FIG. 6 illustrates one implementation of information relating to the inventory of tobacco products.

In one implementation, the electronic system may track and store information relating to the inventory of the chambers only after cigarette packages have been supplied to or dispensed from the chamber 500. In another implementation, the electronic system may track and store information relating to the inventory of the chambers at predetermined time intervals. Referring to FIG. 6, in one implementation, a log 600 includes information relating to the inventory of the chambers and the disbursement of the cigarette packages stored by the electronic system. By reviewing the information, a manager may identify discrepancies in the number of cigarette packages in the chambers. For example, the final entry in FIG. 6 indicates that there are eight cigarette packages in chamber B whereas the previous entry indicates that there were previously ten cigarette packages in chamber B. A manager may investigate the discrepancy by contacting the operator.

In one implementation, the information in log 600 is sorted chronologically. The information also may be sorted according to any of the chamber identifier, the number of cigarette packages, the operator, and/or the product SKU of the cigarette package.

A number of implementations have been described. Nevertheless, it will be understood that various modifications may be made. For example, the door can include one or more electronic or video displays that includes advertising information for the cigarettes being sold. In another example, the light emitted from the light emitting element 505 may be collimated to reduce the scattering of light. In another example, the tracking system may include ultrasonic emitters and detectors. In a further example, the tracking system may include a laser. In another example, the light detecting elements 515 may be light sensitive resistors.

This and other implementations are within the scope of the following claims.

What is claimed is:

1. A device for storing and dispensing product packages, the device comprising:
    a housing containing a plurality of chambers, wherein each chamber is configured to store product packages;
    a tracking system supported by the housing and configured to track a number of product packages in each chamber as product packages are dispensed from the chambers, wherein the tracking system comprises at least two pairs of light emitting elements and at least two pairs of light detection elements, where light detection elements in a particular pair of light detection elements are positioned on opposing sides of an interior of a particular chamber of the plurality of chambers; and
    an electronic system in communication with the tracking system and configured to enable dispensing of the product packages from the chambers, wherein the electronic system is further configured to:
        determine, based on detection by at least one of the light detection elements in the particular pair of light detection elements, a collimated beam of light emitted from a corresponding light emitting element in the particular pair of light emitting elements, that a product package has been dispensed from the particular chamber of the plurality of chambers;
        generate a data entry in response to the determination that the product package has been dispensed, the data entry comprising a product package identifier associated with the particular chamber, an operator identifier, and time information; and
        store the data entry in a data log.

2. The device of claim 1, wherein the particular pair of light emitting elements comprise light-emitting diodes.

3. The device of claim 1, wherein a number of the at least two pairs of light detection elements are disposed in each chamber, the number of pairs of light detection elements being equal to a maximum number of product packages that may be stored in each chamber.

4. The device of claim 1, wherein the data entry further comprises a chamber identifier and the number of product packages in each of the plurality of chambers.

5. The device of claim 1, wherein the device further comprises an output device configured to output the data entry.

6. The device of claim 1, wherein the device further comprises an input device configured to receive an indication from an operator to dispense the product packages from the chambers.

7. The device of claim 6, wherein the indication from the operator is an operator code associated with the device and the operator.

8. The device of claim 1, wherein the housing further comprises a portion configured to display advertising information related to the product packages.

9. The device of claim 1, further comprising a pusher-foot, wherein one or more light emitting elements of the at least two pairs of light emitting elements are connected to the pusher-foot.

10. The device of claim 9, wherein a first pair of the at least two pairs of light detection elements are disposed at a substantially identical height on a first vertical surface of the particular chamber of the plurality of chambers, and a first pair of the at least two pairs of light emitting elements are disposed on the pusher-foot.

11. A method of storing and dispensing product packages comprising:
   storing product packages in a plurality of chambers of a housing;
   receiving, from an operator, an indication to dispense a product package;
   dispensing the product package in response to the received indication;
   detecting at least one collimated beam of light, emitted from at least one light emitting element of a pair of light emitting elements disposed in a chamber of the plurality of chambers, at an associated light detection element of a pair of light detection elements positioned on opposite sides of the chamber;
   determining, based on the detection of light, that a product package has been dispensed;
   determining, based on the detection of the collimated beam of light, a number of product packages remaining in the chamber;
   generating a data entry in response to the determination that the product package has been dispensed, the data entry comprising a product package identifier associated with the chamber, an operator identifier, and time information; and
   storing the data entry in a data log.

12. The method of claim 11, wherein the at least one light emitting element comprises a light-emitting diode.

13. The method of claim 11, wherein a number of pairs of light detection elements are disposed in each chamber, the number of pairs of light detection elements being equal to the maximum number of product packages that may be stored in each chamber.

14. The method of claim 11, wherein the data entry further comprises a chamber identifier and the number of product packages in each of the plurality of chambers.

15. The method of claim 11, further comprising outputting the data entry.

16. The method of claim 11, wherein the indication to dispense one or more of the of product packages is an operator code associated with the device and the operator.

17. The method of claim 11, wherein storing the product packages in the plurality of chambers of the housing comprises storing a different brand of the product packages in each of the plurality of chambers of the housing.

18. The method of claim 11, further comprising displaying advertising information related to the product packages.

19. The method of claim 11, wherein detecting light comprises detecting light emitted from the pair of light emitting elements disposed on a pusher-foot, at the pair of light detection elements disposed at a substantially identical height on a first vertical surface of the chamber.

20. A device for storing and dispensing product packages, the device comprising:
   a housing containing one or more chambers, each chamber configured to store product packages;
   a tracking system supported by the housing and configured to track a number of product packages remaining in each chamber as product packages are dispensed from the chambers, at least one light emitting element and at least one pair of light detection elements disposed in a chamber of the plurality of chambers, the light detection elements in a particular pair of light detection elements positioned on opposing sides of an interior of the chamber; and
   an electronic system in communication with the tracking system and configured to enable dispensing of the product packages from the chambers, the electronic system further configured to:
      determine, based on detection by at least one of the light detection elements in the particular pair of light detection elements, a beam of light emitted from a corresponding light emitting element in the at least one light emitting element, that a product package has been dispensed from the particular chamber of the plurality of chambers;
      generate a data entry in response to the determination that the product package has been dispensed, the data entry comprising a product package identifier associated with the chamber and time information; and
      store the data entry in a data log.

* * * * *

UNITED STATES PATENT AND TRADEMARK OFFICE
CERTIFICATE OF CORRECTION

| | |
|---|---|
| PATENT NO. | : 8,725,290 B2 |
| APPLICATION NO. | : 13/795388 |
| DATED | : May 13, 2014 |
| INVENTOR(S) | : John Wesley Templer and Mark Allsup |

It is certified that error appears in the above-identified patent and that said Letters Patent is hereby corrected as shown below:

In the Claims:

Claim 16, column 7, line 41, after "the" delete "of".

Signed and Sealed this
Second Day of September, 2014

Michelle K. Lee
*Deputy Director of the United States Patent and Trademark Office*